(No Model.)

W. H. STEELE.
METHOD OF COATING HARNESS TRIMMINGS.

No. 442,149. Patented Dec. 9, 1890.

WITNESSES:
Howard M. Holbrook
M. C. Proctor

INVENTOR
William H. Steele
BY
F. C. Woodward
ATTORNEY.

UNITED STATES PATENT OFFICE.

WILLIAM H. STEELE, OF NEWARK, NEW JERSEY, ASSIGNOR TO THE CAHOONE-BARNET MANUFACTURING COMPANY, OF SAME PLACE.

METHOD OF COATING HARNESS-TRIMMINGS.

SPECIFICATION forming part of Letters Patent No. 442,149, dated December 9, 1890.

Application filed June 12, 1890. Serial No. 355,144. (No model.)

*To all whom it may concern:*

Be it known that I, WILLIAM H. STEELE, of Newark, New Jersey, a citizen of the United States, have invented certain new, useful, and important Improvements in the Process of Coating Harness-Trimmings and other Articles, as set forth in this specification and the drawings thereof sufficiently to enable any one skilled in the art to make and use the same.

My invention consists in the manipulation of plastic varnish or composition material and the cores or foundations to be covered therewith, constituting a process of coating harness-trimmings and other articles with plastic varnish or composition material, the object being to condense and harden the plastic varnish or composition material on the cores or foundations, thereby adding to the durability and finish of the manufacture. One form of plastic varnish used is described in Letters Patent of the United States No. 242,507, dated June 7, 1881.

Figure 1:
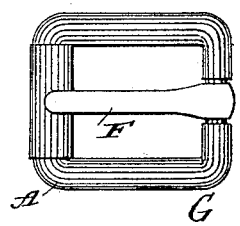
Figure 2:
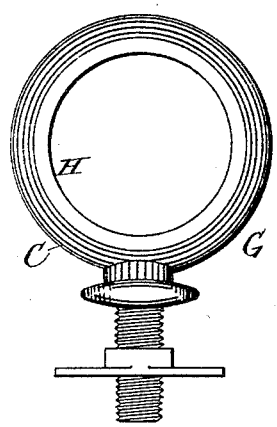
Figure 3:
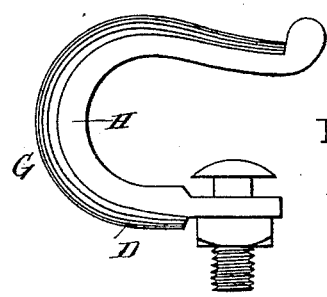
Figure 4:
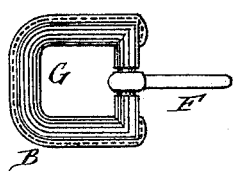
Figure 5:
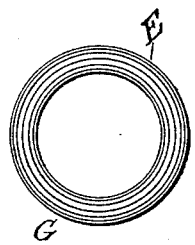

In the drawings, Figures 1 and 4 represent harness-buckles A and B. Fig. 2 represents a harness rein-terret C; Fig. 3, a harness check-hook D; Fig. 5, a harness-ring E.

The buckles, except the tongues F, are entirely coated with plastic varnish or composition material G, the ring entirely coated thereby, and the terret and hook covered therewith on the outer portions thereof, but not on the inner parts H of the same.

In carrying out my invention in one manner the plastic varnish or composition material to be used is made in sheet form and cut into pieces of the right size and shape to suit the cores or foundations to be covered thereby, whether they are buckles, terrets, hooks, rings, or other articles. The cores or foundations are then heated very hot by fire heat, the plastic varnish or composition material in a hot condition is applied to the hot cores or foundations, and the articles are then placed in heated dies and pressed, and after cooling sufficiently they are removed therefrom and placed in an oven and baked sufficiently to make the coating hard and strong. They are then placed upon a steam-table and heated as hot as steam will make them, and while in that heated condition are placed in hot finishing-dies and again pressed and finished. The dies used for the second pressing are heated very hot by steam. The baking, steam-heating, and second pressing or finishing hardens and condenses the coating of plastic varnish or composition material in a high degree upon the cores or foundations and adds greatly to the durability and finish of the goods, and renders the coating tough and refractory and susceptible of a high finish without injury from frictional heat.

The heating of the cores or foundations by fire causes the coating to adhere more strongly to them than would be the case with steam heat. The cores or foundations should be sufficiently heated to cause the plastic varnish or composition material to adhere to them.

The details of construction and operation may be varied without departing from the scope of my improvements. For example, composition material of any kind that can be made plastic and that will answer the purpose may be employed with cores or foundations of any suitable articles to be coated and used in any desirable form, and any kind or degree of heat that will answer the purpose may be used in any of the steps of the process where heat is required.

I claim as my invention—

1. The process of coating harness-trimmings and other articles with plastic material, consisting in heating the cores or foundations to be coated, then applying the plastic material to the heated cores or foundations, then pressing the plastic material on the cores or foundations in heated dies, then baking and heating the articles by steam heat, and then re-pressing them in heated finishing-dies.

2. The process of coating harness-trimmings and other articles with plastic material, consisting in applying the plastic material to the cores or foundations of the articles, then pressing the plastic material on the cores or foundations by compression-dies, then baking and heating the articles by steam heat, and then re-pressing them in finishing-dies.

In testimony whereof I hereunto subscribe my signature and set my seal, in the presence of two witnesses, this 10th day of March, 1890.

WILLIAM H. STEELE. [L. S.]

Witnesses:
THOS. PRUITT,
JOHN D. TODD.